United States Patent [19]
Lee et al.

[11] Patent Number: 5,466,763
[45] Date of Patent: Nov. 14, 1995

[54] HIGH PERFORMANCE EPOXY RESIN MODIFIED BY A POLYSULFIDE POLYMER DERIVED FROM THE HEAVY ENDS WASTE OF CHLORINATED HYDROCARBON PRODUCTION

[75] Inventors: Chester C. Lee, North Plainfield, N.J.; Tao C. Chang, Port Lavaca, Tex.; Yung-Hui Huang, Parsippany, N.J.

[73] Assignee: Formosa Plastics Corporation, Livingston, N.J.

[21] Appl. No.: 336,259

[22] Filed: Nov. 8, 1994

Related U.S. Application Data

[63] Continuation-in-part of Ser. No. 329,532, Oct. 26, 1994, Pat. No. 5,432,257.

[51] Int. Cl.⁶ .................................................. C08F 283/00
[52] U.S. Cl. ........................... 525/523; 525/535; 528/373
[58] Field of Search ..................................... 525/523, 535; 528/373

[56] References Cited

U.S. PATENT DOCUMENTS

| | | | |
|---|---|---|---|
| 2,789,958 | 4/1957 | Fettes et al. | 528/109 |
| 3,882,091 | 5/1975 | Villa | 525/523 |
| 4,025,495 | 5/1977 | Peerts et al. | 528/381 |
| 4,214,067 | 7/1980 | Parker | 525/523 |
| 4,829,133 | 5/1989 | Hafner, Jr. et al. | 525/523 |

FOREIGN PATENT DOCUMENTS

| | | | |
|---|---|---|---|
| 2162189 | 7/1985 | United Kingdom . | |

OTHER PUBLICATIONS

Peterson, E. A., *Polysulfides, Adhesive Materials: Chemical Families*, pp. 138–142.

Rees, T. M., et al., The Modern Approach to Modifying Epoxy Resins Using Liquid Polysulfides: Part 1, *JOCCA* pp. 39–46.

*Primary Examiner*—Mark Sweet
*Attorney, Agent, or Firm*—Kenneth P. Glynn; Stephen J. Driscoll

[57] ABSTRACT

A process is disclosed for preparing a polysulfide-epoxy prepolymer and cured co-polymer using a heavy ends waste generated in chlorinated hydrocarbon production. The process comprises first distilling the heavy ends waste to form an enriched heavy ends waste with an ethylene dichloride content less than about 10% by weight. The enriched heavy ends waste is then reacted with an alkaline polysulfide within a temperature range of about 50° C. to about 150° C. to form a polysulfide polymer mixture. Next, between about 5 and about 300 parts of the polysulfide polymer mixture is co-reacted with a hundred parts by weight of an epoxy resin to form a polysulfide-epoxy prepolymer or a cured co-polymer if a curing agent is present.

20 Claims, No Drawings

5,466,763

HIGH PERFORMANCE EPOXY RESIN MODIFIED BY A POLYSULFIDE POLYMER DERIVED FROM THE HEAVY ENDS WASTE OF CHLORINATED HYDROCARBON PRODUCTION

REFERENCE TO RELATED CASE

This application is a continuation-in-part of U.S. patent application 08/329,532 filed on Oct. 26, 1994, now U.S. Pat. No. 5,432,257 by Chester C. Lee, Tao C. Chang, and Yung-Hui Huang, entitled "A Process for Manufacturing a Polysulfide Polymer From the Heavy Ends Waste of Chlorinated Hydrocarbon Production," incorporated by reference herein.

BACKGROUND OF THE INTENTION

1. Field of the Invention

This invention relates both to solving the disposal problem of heavy ends waste generated from the manufacture of chlorinated hydrocarbons such as ethylene dichloride and/or vinyl chloride, and to improving epoxy resin by modifying it with a low odor, polysulfide polymer. Herein, a process is disclosed for using the heavy ends waste to produce polysulfide-epoxy co-polymers.

2. Information Disclosure Statement

The production of resinous products by co-reacting polysulfide polymers with polyepoxide resins in the presence of catalyst is well known in the prior art. In 1957, U.S. Pat. No. 2,789,958 disclosed reacting a resinous reaction between the mercaptan groups of polysulfide and the oxirane groups of the polyepoxide which forms the basis for co-reacting polysulfide polymers with epoxy resins. Despite their success as tough, chemical resistant coatings and adhesives, the polysulfide-epoxy system suffers from a mercaptan odor which persists until the system begins to cure.

Since then, methods of producing a low odor polysulfide-epoxy co-polymer have been disclosed. In 1985, G.B. Patent No. 2,162,189 disclosed a procedure to prepare a stable liquid polysulfide-epoxy prepolymer which has a long pot life before curing with a hardener. This liquid prepolymer, however, is made from pure starting chemicals which increase costs. Furthermore, the polysulfide polymer must be co-reacted with a molar excess of epoxy resin to reduce the odor; prior to the co-reaction, an offensive odor exists. Similar methods and products have been described in E. A. Peterson, Polysulfides, *Adhesive Materials: Chemical Families* pp 138–142 and T. M. Rees et al., *The Modern Approach to Modifying Epoxy Resins Using Liquid Polysulfides*: Part 1, JOCCA pp. 39–46 (1988). Again, these disclosures relate to reducing odor by co-reacting a polysulfide polymer manufactured from pure starting chemicals with epoxy resin. Thus, the prior art fails to disclose a method for using heavy ends waste to produce a low odor polysulfide polymer which can be co-reacted with a molar excess of epoxy resin to further reduce odor.

SUMMARY OF THE INVENTION

The present invention is directed both at solving the disposal problem of "heavy ends" waste generated from the manufacture of chlorinated hydrocarbons such as ethylene dichloride and/or vinyl chloride, and at improving epoxy resin by modifying it with a low odor, polysulfide polymer. To these ends, a process is disclosed for preparing a polysulfide-epoxy prepolymer and cured co-polymer using a heavy ends waste generated in chlorinated hydrocarbon production. The process comprises first pretreating the heavy ends waste by an enriching process to form an enriched heavy ends waste with an ethylene dichloride content less than about 10% by weight. The enriched heavy ends waste is then reacted with an alkaline polysulfide within a temperature range of about 50° C. to about 150° C. to form a polysulfide polymer mixture. Next, between about 5 and about 300 parts of the polysulfide polymer mixture is co-reacted with a hundred parts by weight of an epoxy resin to form a polysulfide-epoxy prepolymer or a cured co-polymer if a curing agent is present.

DETAILED DESCRIPTION OF THE INVENTION

The present invention discloses a process for manufacturing polysulfide-epoxy prepolymers and cured co-polymers from the heavy ends waste of chlorinated hydrocarbon production. The polysulfide-epoxy co-polymers produced from this process emit no offensive odor. Using the heavy ends waste rather than pure starting materials not only reduces raw material costs dramatically, but also resolves a waste disposal problem.

The heavy ends waste is generated from the distillation and/or purification of chlorinated hydrocarbons such as ethylene dichloride and/or vinyl chloride. It consists of a mixture of various organic chlorinated hydrocarbons. An analysis of heavy ends wastes obtained from several plant sites has shown a predominance of mixtures of short chain chlorinated hydrocarbons including 1,2-dichloroethane, 1,1, 2-trichloroethane, 1,1,2,2-tetrachloroethane and perchloroethylene. These highly chlorinated aliphatics generally range between 40 and 70% by weight of the total chlorinated organic compounds. The other components of the heavy ends waste include different chlorinated aromatic and cycloaliphatic compounds such as chlorobenzene, dichlorobenzene, chloroxylenes and dichlorocyclohexadiene. The relative percentages of these compounds depends on the purity of the raw materials used in the process as well as the plant operating conditions.

Since these chlorinated or polychlorinated hydrocarbons pose a high risk to human health, traditionally they were either incinerated or recovered as a chlorinated organic solvent. These methods, however, suffer several shortcomings. For example, the high temperature of incineration creates dioxane——a highly toxic atmospheric pollutant. Incineration is consequently strictly regulated and limited by law. Recovery of chlorinated solvent is also constrained by environmental concerns. Thus, the present invention provides an alternative process to treat the heavy ends waste generated from chlorinated hydrocarbon production.

The heavy ends waste comprises a high quantity of di-chloro and/or poly-chloro compounds which allows it to be polymerized with an inorganic polysulfide to form polysulfide polymer. The polysulfide polymer produced is a complex mixture of various organic polysulfides which differs considerably from the product derived from pure starting chemicals. For instance, it has enhanced cross-linking due to presence of polyhalogenated compounds. Unfortunately, the heavy ends waste also consists of low molecular weight dihalides which produce an obnoxious odor. This odor must be reduced to make the product commercially viable. To this end, the present invention teaches co-reacting the polysulfide polymer mixture with epoxy resin to produce a polysulfide-epoxy co-polymer without any offensive odor. Thus, the invention not only solves the heavy ends waste disposal problem, but also provides for a commercially useful material.

The present invention relates to a process for preparing polysulfide-epoxy co-polymers using the heavy ends waste generated by chlorinated hydrocarbon production. The process first involves pretreating the heavy ends waste using an enriching process. The enriching process forms an enriched heavy ends waste with an ethylene dichloride content less than about 10% by weight. Next, the enriched heavy ends waste is reacted with alkaline polysulfide within a temperature range of about 50° C. to about 150° C. Finally, the polysulfide polymer is co-reacted with a molar excess of an epoxy resin to form either a cured polysulfide-epoxy co-polymer in the presence of a curing agent, or a polysulfide-epoxy prepolymer in the absence of a curing agent.

The enrichment technique is well known in the separation and purification industry. It involves any traditional distillation process for reducing the ethylene dichloride concentration in the heavy ends waste. This concentration is typically about 10–40% by weight of heavy ends waste obtained from a storage tank. By reducing the ethylene dichloride concentration below about 10% by weight, a reduction in odor of the polysulfide polymer is realized. This odor reduction becomes much more significant when the concentration is below about 5%. Moreover, for optimum odor reduction, an ethylene dichloride concentration of less than about 1% by weight is preferred. This pretreatment process not only separates most of the low molecular weight components from the heavy ends waste to produce low odor polysulfide polymer mixtures, but also enriches the polyhalogenated compounds to create polymer chains with enhanced crosslinking. This can impart the polymer with excellent resistance to certain chemicals and solvents.

Different ranks of aqueous sodium polysulfide solution can be prepared by adding sulfur to aqueous sodium sulfide solution while agitating and maintaining a temperature range of 70° to 80° C. until a homogeneous solution forms. Alternatively, various ranks of sodium polysulfide solution can be prepared by adding sulfur to a caustic soda solution under the same conditions.

Liquid polysulfide polymer mixtures with rank from one to five are prepared by reacting a stoichiometric amount of the enriched heavy ends waste with a slight excess of sodium polysulfide in the presence of water as a suspension medium. The stoichiometric amount of mineral polysulfide is defined as two atoms of alkali metal to two atoms of chlorine atoms present in the heavy ends waste. Although using mineral polysulfide higher than the stoichiometric values has no detrimental effect on the polysulfide polymer, it is not economical to use sodium polysulfide higher than 130% by weight of the molar theoretical quantity. Liquid polysulfide polymer mixtures with rank from one to five are also prepared by reacting stoichiometric amounts of the enriched heavy ends waste with sodium polysulfide solution lower than the stoichiometric values. Under these conditions, however, a significant amount of heavy ends waste may not react.

The modified polysulfide polymers produced from this process are black liquid mixtures of various organic polysulfides with significantly low mercaptan odor. Alternatively, the invention provides for the production of different ranks of polysulfide polymer mixtures by reacting the sodium polysulfide with the enriched heavy ends waste in the presence of a dispersion agent. Metallic hydroxides such as ferrous, aluminum, calcium and magnesium hydroxides can be used as dispersion agents. In one embodiment, magnesium hydroxides are prepared in situ by dissolving the magnesium chloride in a basic water medium.

Since the dispersion polymerization of organic dihalides with alkaline polysulfide is exothermic, the enriched heavy ends waste must be introduced slowly into the aqueous sodium polysulfide solution. The heavy ends waste is added to the solution within a range of about 15 minutes to about two hours while stirring. In a preferred embodiment, the waste is added within about 15 minutes to about one hour while maintaining the mixture's temperature between about 80° C. and about 100° C. The reaction mixture is then reacted for about one to about eight hours, and preferably for about one to about four hours with consistent agitation to achieve a complete reaction.

After the reaction, the polysulfide polymer may require separation from the mother liquor and purification to facilitate its co-reaction with the epoxy resin. Although many separation/purification methods are possible, a preferred method is steam stripping the reaction mixture within a temperature range of about 100° C. to about 150° C. This removes the VOC concentration from the mother liquor in a commercially practical manner. The polysulfide polymer mixture is finally liberated by decanting the mother liquor. At this point, the polysulfide polymer can co-react with the epoxy resin.

Various modified polysulfide polymer mixtures with ranks from one to five are co-polymerized with epoxy resins at concentrations between about 5 and about 300 parts of polysulfide polymer per hundred parts by weight of epoxy resin. This co-reaction produces an odor free polysulfide-epoxy prepolymer, or a cured polysulfide-epoxy co-polymer if a curing agent is present. A typical epoxy resin is diglycidyl ether of bisphenol A (DGEBA) derived from bisphenol A and epichlorohydrin. Commercially available epoxy resins include Shell Chemical's Epon 815 and 828, Ciba-Geigy's Aradite 6020 and 6030, Dow Chemical's DER 331 and 332, and Union Carbide's ERL 2772 and 2774. These resins are widely used in protective coatings, electrical encapsulations, and structural applications due to their superior electrical and mechanical properties. The incorporation of a polysulfide polymer component into an epoxy resin improves certain properties of an epoxy resin system without adversely affecting others. That is, incorporating liquid polysulfide polymer into epoxy resin reduces viscosity, enhances adhesion, introduces flexibility, and improves resistance to chemicals and solvents.

The physical properties of a typically polysulfide-epoxy prepolymer and/or co-polymer can be optimized for a specific application by altering the composition of the modified polysulfide polymer in the epoxy resin system. For example, a cured polysulfide-epoxy co-polymer containing 100% to 200% by weight of the liquid polysulfide, and preferably 130% to 140%, has improved resistance to thermal cycling and moisture degradation, and consequently can be used as a high performance sealant for the construction and transportation industries.

Polysulfide-epoxy co-polymers used as coatings and adhesives are typically two pack systems. One part contains the epoxy resin with other additives, the other part contains the polysulfide polymer and epoxy curing agent. The level of liquid polysulfide in the cured polysulfide-epoxy co-polymer ranges from 5 to 90 phr of epoxy resin, and preferably from 5 to 50 phr. The two components are mixed together at the time of application and allowed to co-react. The cured polysulfide-epoxy co-polymer has no mercaptan odor.

In the manufacture of the polysulfide-epoxy prepolymer, the polysulfide polymer co-reacts with the epoxy resin to form a stable prepolymer which is end-capped with oxirane groups instead of mercaptan terminals. This minimizes the mercaptan odor. The resulting liquid polysulfide-epoxy prepolymer can be cured either by a curing agent or by heat in situ. Thus, the polysulfide-epoxy prepolymer not only has a low mercaptan odor in the uncured state, but also is a liquid, single component adhesive.

The prepolymer compositions having a viscosity range 20 to 30 Pascal seconds are suitable for use as solventless adhesives or high build coatings. Such prepolymer compositions can be used either as a 100 per cent binder or as a flexibilizing additive for other epoxy based coatings and adhesives. The polysulfide-epoxy prepolymer can be cured like any epoxy resin at a later stage with any conventional epoxy hardener. For example, diethylenetriamine works well at a concentration of about 12 parts per hundred parts of resin by weight. The amount of curing agent used with the liquid polysulfide-epoxy prepolymer and co-polymer systems depends on the prepolymer composition and is calculated from the epoxide equivalent weight of the prepolymer and the hydrogen equivalent weight of the curing agent.

Additives such as fillers, pigments and plasticizers can be added to the polysulfide-epoxy system. The physical properties of a system may be modified by these additives in ways known to one skilled in the art.

According to the present invention, the environmentally hazardous heavy ends waste can now be converted into a useful end product of polysulfide-epoxy prepolymer and/or cured polysulfide-epoxy co-polymer by a simple process without the associated problem of offensive odor. Moreover, by using the heavy ends waste, the present invention also reduces raw material costs.

Obviously, numerous modifications and variations of the present invention are possible in the light of the above teachings. It is therefore understood that within the scope of the appended claims, the invention may be practiced otherwise than as specifically described herein.

EXAMPLE 1

Enriched heavy ends waste obtained as a residue after fractional distillation was analyzed by gas chromatography. The composition by weight was as follows: 35.19% of 1,1,2-trichloroethane, 0.11% of 1,2-dichloroethane, 12.10% of chlorobenzene, 1.49% of 1,1,2,2-tetrachloroethane, 0.06% of perchloroethylene, and 51.05% of remaining chlorohydrocarbons (lumped as a single component in this analysis).

A sodium polysulfide solution having a rank of sulfur equal to 2.0 was prepared by the following process: 169.0 g of technical sodium sulfide containing 60% by weight of $Na_2S$ and 41.6 g of sulfur were added into 650 ml of water in a flask equipped with an agitator; next, the mixture was heated to 70° C. while agitating until the solution was homogeneous. The final concentration of sodium polysulfide solution was 2M and the stoichiometric ratio between sodium polysulfide and enriched heavy ends waste was 1.3.

In a reaction vessel filled with the aqueous sodium polysulfide solution, 120 g of enriched heavy ends waste were slowly added into the reaction vessel within 30 minutes. The reaction temperature was maintained at 105° C. while the reaction medium was agitated continuously for five hours.

After the end of the reaction, 124 ml of concentrated HCl solution (36.5%) was added to the reaction mixture. The coagulated polymer was washed with 200 ml of water. A viscous black polymer liquid with a low mercaptan odor was obtained. The resultant product weighed 239.3 g.

EXAMPLE 2

Heavy ends waste obtained directly from the heavy ends storage tank was analyzed by gas chromatography. The composition by weight was as follows: 25.96% of 1,1,2-trichloroethane, 12.62% of 1,2-dichloroethane, 1.97% of chlorobenzene, 0.81% of 1,1,2,2-tetrachloroethane, 0.16% of perchloroethylene, and 58.48% of remaining chlorohydrocarbons (lumped as a single component in this analysis).

The procedure described in Example 1 was repeated by treating the hereinabove heavy ends waste. The resultant product was black and had a very unpleasant odor. It weighed 196.5 g.

EXAMPLE 3

The enriched heavy ends waste used in Example 1 was treated in the presence of a dispensing agent according to the following process:

77.0 grams of technical sodium sulfide containing 60% by weight of $Na_2S$ and 19.0 g of sulfur were added into 650 ml of water to prepare an aqueous sodium polysulfide solution having a rank of sulfur equal to 2.0;

The mixture was then heated to 70° C. with agitation until the solution was homogeneous.

In a reaction vessel filled with the aqueous sodium polysulfide solution, an in-situ dispensing agent, $Mg(OH)_2$, was used by adding 31.8 g of magnesium chloride hexahydrate and 12.5 g of 5N NaOH solution into the aqueous solution.

50 grams of enriched heavy ends waste were then slowly added into the reaction vessel within 30 minutes. The reaction temperature was maintained at 105° C. while the reaction medium was agitated continuously for eight hours.

After the reaction, the precipitated polymer was separated from the reaction mother liquid. The resultant powder was pasty and dark with no significant mercaptan odor. It weighed 62.4 g.

EXAMPLE 4

Example 1 was repeated but using a different procedure to separate the polysulfide polymer from the reaction mother liquid.

After the end of the reaction, 200 ml of toluene was added into the reaction mixture. The polysulfide polymer was dissolved in the toluene and separated from the reaction mother liquid. After air dried, the resultant product was pasty and black with no significant mercaptan odor. It weighed 219.2 g.

EXAMPLE 5

Example 1 was repeated by treating the same enriched heavy ends waste with a sodium polysulfide solution having a rank of sulfur equal to 3.5. After the reaction was completed, the reaction mother liquid was decanted and the polymer was washed by 200 ml of water. The resultant product was pasty and black with no significant mercaptan odor. It weighed 241.5 g.

EXAMPLE 6

Example 1 was-repeated by treating the same enriched heavy ends waste with a sodium polysulfide solution having a rank of sulfur equal to 5.0. After the reaction, the reaction mother liquid was decanted and the polymer was washed by 200 ml of water. The resultant product was a black mastic gum with no significant mercaptan odor. It weighed 256.3 g.

EXAMPLE 7

The polysulfide polymer prepared in Example 1 was dissolved in toluene and then co-polymerized with an epoxy resin in the presence of a curing agent. The epoxy resin used was Epon 828 from Shell Chemical Corporation, and the curing agent used was DETA (diethylenetriamine) at a concentration of 12 phr. The cured polsulfide-epoxy co-polymer samples containing 15, 30, 45, 60 and 90 phr were prepared and coated on various surface. These samples were all cured for seven days at room temperature before testing. The effects of polysulfide polymer on physical properties of epoxy resin are tabulated as follows:

| Composition (phr) | 0 | 15 | 30 | 45 | 60 | 90 |
|---|---|---|---|---|---|---|
| Lap Shear Strength (Ksi) (adhesion to steel) | 0.95 | 1.90 | 3.34 | 2.82 | 2.35 | 1.50 |
| Lap Shear Strength (Ksi) (adhesion to rusty steel) | 1.15 | 1.85 | 2.90 | 2.70 | 2.10 | 1.25 |
| Lap Shear Strength (Ksi) (after 14 days immersion in 40° C. of water) | 0.45 | 0.85 | 1.67 | 1.40 | 1.15 | 0.80 |
| Impact Resistance at 25° C. (ft-lb) | 2 | 15 | 34 | 70 | 85 | 95 |
| Hardness, (Shore D) | 80 | 77 | 67 | 63 | 54 | 40 |
| Elongation % | 0 | 7 | 15 | 21 | 34 | 66 |
| Tensile Strength (Ksi) | 3.5 | 4.6 | 5.5 | 4.5 | 3.4 | 1.2 |

EXAMPLE 8

The polysulfide polymer mixture prepared in example 1 was also dissolved in toluene and then co-polymerized with another epoxy resin with additives in the presence of a curing agent. The epoxy resin used was a two-component system of EMI-464 from Energy Maintenance Inc., a division of Plant Maintenance Inc. Component A is an epoxy resin with additives containing epoxy resin, epoxy novolac and silicon dioxide. Component B is curing agent with additives containing modified cycloaliphatic polyamine, silicon dioxide, magnesium silicate and titanium dioxide. The mixing ratio of component A and B is 1 to 1. The polysulfide-epoxy resin was prepared and coated on various surface. These samples were all cured for seven days at room temperature before testing. The effects of polysulfide polymer on physical propertied of epoxy resin are tabulated as follows:

| Composition (phr) | 0 | 15 | 30 | 45 | 60 | 90 |
|---|---|---|---|---|---|---|
| Lap Shear Strength (Ksi) (adhesion to steel) | 1.25 | 2.40 | 4.10 | 3.40 | 2.65 | 1.55 |
| Lap Shear Strength (Ksi) (adhesion to rusty steel) | 1.35 | 2.15 | 3.70 | 2.90 | 2.40 | 1.10 |
| Lap Shear Strength (Ksi) (after 14 days immersion in 40° C. of water) | 0.75 | 1.05 | 1.90 | 1.75 | 1.45 | .55 |
| Impact Resistance at 25° C. (ft-lb) | 4.8 | 45 | 76 | 98 | 124 | 146 |
| Hardness (Shore D) | 85 | 80 | 75 | 70 | 65 | 50 |
| Elongation (%) | 3 | 7 | 17 | 22 | 34 | 76 |
| Tensile Strength (Ksi) | 8.5 | 10.2 | 12.4 | 9.6 | 8.0 | 3.4 |

EXAMPLE 9

According to the procedure of Example 7, a polysulfide-epoxy co-polymer was prepared with the polysulfide polymer mixture obtained from example 2. The effects of poly sulfide polymer on physical properties of epoxy resin are tabulated as follows:

| Composition (phr) | 0 | 15 | 30 | 45 | 60 | 90 |
|---|---|---|---|---|---|---|
| Lap Shear Strength (Ksi) (adhesion to steel) | 0.95 | 1.85 | 3.25 | 2.70 | 2.25 | 1.45 |
| Lap Shear Strength (Ksi) (adhesion to rusty steel) | 1.15 | 1.80 | 2.80 | 2.60 | 2.05 | 1.20 |
| Lap Shear Strength (Ksi) (after 14 days immersion in 40° C. of water) | 0.45 | 0.80 | 1.60 | 1.35 | 1.10 | 0.75 |
| Impact Resistance at 25° C. (ft-lb) | 2 | 13 | 32 | 67 | 80 | 90 |
| Hardness (Shore D) | 80 | 75 | 65 | 60 | 50 | 35 |
| Elongation (%) | 0 | 8 | 15 | 20 | 30 | 65 |
| Tensile strength (Ksi) | 3.5 | 4.3 | 5.0 | 4.2 | 3.0 | 1.0 |

EXAMPLE 10

The polysulfide polymer mixture prepared in example 1 was dissolved in toluene and then intimately mixed with the epoxy resin Epon 828. Polysulfide-epoxy prepolymer samples containing 100, 150, 200 and 300 phr of epoxy resin were prepared as adducts. After six months of storage, these samples were cured with 12 phr of DETA for seven days at room temperature before testing. The physical properties of the cured polysulfide-epoxy adducts are tabulated as follows:

| Composition (phr) | 100 | 150 | 200 | 300 |
|---|---|---|---|---|
| Lap Shear Strength (Ksi) (adhesion to steel) | 1.45 | 1.35 | 1.20 | 1.05 |
| Lap Shear Strength (Ksi) (adhesion to rusty steel) | 1.20 | 1.15 | 1.05 | 1.00 |
| Lap Shear Strength (Ksi) (after 14 days immersion in 40° C. of water) | 0.75 | 0.65 | 0.60 | 0.55 |
| Impact Resistance at 25° C. (ft-lb) | 100 | 125 | 195 | 280 |
| Hardness (Shore D) | 35 | 22 | 8 | 2 |

What is claimed is:

1. A process for preparing a polysulfide-epoxy prepolymer using a heavy ends waste generated in chlorinated hydrocarbon production, which comprises:
    (a) distilling said heavy ends waste to form an enriched heavy ends waste with an ethylene dichloride content less than 10% by weight;
    (b) reacting said enriched heavy ends waste with an alkaline polysulfide within a temperature range of about 50° C. to about 150° C. to form a polysulfide polymer mixture; and (c) co-reacting between about 5 and about 30 parts of said polysulfide polymer mixture with a hundred parts by weight of an epoxy resin to form a polysulfide-epoxy prepolymer.

2. The process of claim 1 wherein said enriched heavy ends waste has an ethylene dichloride content of less than 1% by weight.

3. The process of claim 2 wherein said alkaline polysulfide is an alkali metal polysulfide solution selected from the group consisting of sodium polysulfide solution and potassium polysulfide solution.

4. The process of claim 2 wherein reacting said enriched heavy ends waste with said alkali metal polysulfide solution comprises slowly adding said enriched heavy ends waste to said alkali metal polysulfide solution within about 15 minutes to about 2 hours while stirring and maintaining a temperature range of about 80° to about 100° C.

5. The process of claim 3 wherein reacting said enriched heavy ends waste with said alkali metal polysulfide solution is performed with an excess stoichiometric amount of alkali metal polysulfide solution.

6. The process of claim 2, wherein said process further comprises:
(d) adding additives to said polysulfide-epoxy prepolymer.

7. The polysulfide-epoxy prepolymer produced from the process of claim 2.

8. The polysulfide-epoxy prepolymer produced from the process of claim 3.

9. The polysulfide-epoxy prepolymer produced from the process of claim 4.

10. The polysulfide-epoxy prepolymer produced from the process of claim 5.

11. A process for preparing a cured polysulfide-epoxy co-polymer using a heavy ends waste generated in chlorinated hydrocarbon production, which comprises:
(a) distilling said heavy ends waste to form an enriched heavy ends waste with an ethylene dichloride content less than 10% by weight;

(b) reacting said enriched heavy ends waste with alkaline polysulfide within a temperature range of about 50° C. to about 150° C. to form a polysulfide polymer mixture; and (c) co-reacting between about 5 and about 300 parts of said polysulfide polymer mixture with a hundred parts by weight of an epoxy resin with a curing agent present to form a polysulfide-epoxy co-polymer.

12. The process of claim 11 wherein said enriched heavy ends waste has an ethylene dichloride content of less than 1% by weight.

13. The process of claim 12 wherein said alkaline polysulfide is an alkali metal polysulfide solution selected from the group consisting of sodium polysulfide solution and potassium polysulfide solution.

14. The process of claim 12 wherein reacting said enriched heavy ends waste with said alkali metal polysulfide solution comprises slowly adding said enriched heavy ends waste to said alkali metal polysulfide solution within about 15 minutes to about 2 hours while stirring and maintaining a temperature range of about 80° to about 100° C.

15. The process of claim 13 wherein reacting said enriched heavy ends waste with said alkali metal polysulfide solution is performed with an excess stoichiometric amount of alkali metal polysulfide solution.

16. The process of claim 12, wherein the step of co-reacting said polysulfide polymer mixture with said epoxy resin includes adding additives.

17. The cured polysulfide-epoxy co-polymer produced from the process of claim 12.

18. The cured polysulfide-epoxy co-polymer produced from the process of claim 13.

19. The cured polysulfide-epoxy co-polymer produced from the process of claim 14.

20. The cured polysulfide-epoxy co-polymer produced from the process of claim 15.

\* \* \* \* \*